C. LOSCHER.
SEWER-CLEANER.
No. 193,096. Patented July 17, 1877.
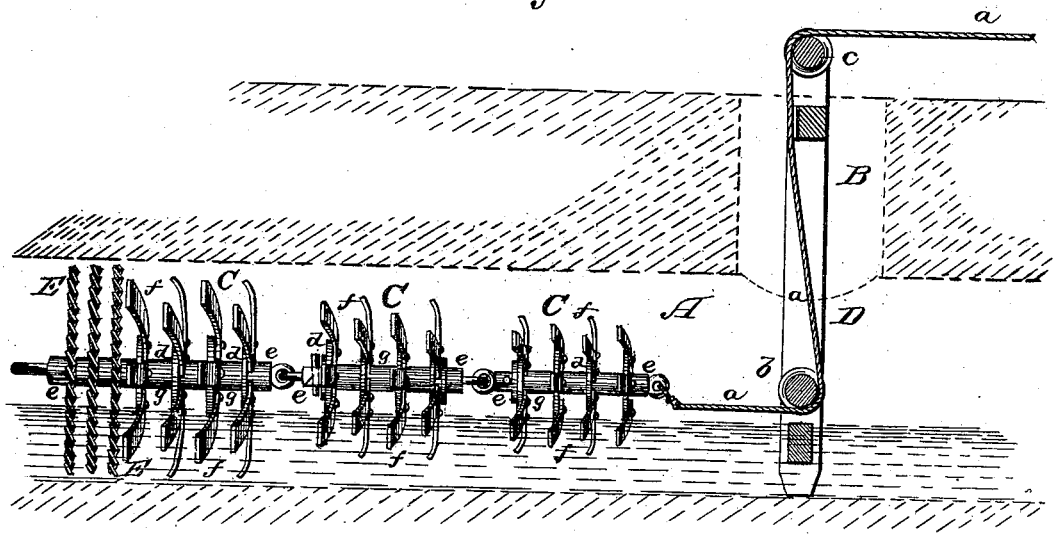
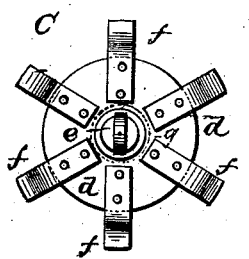
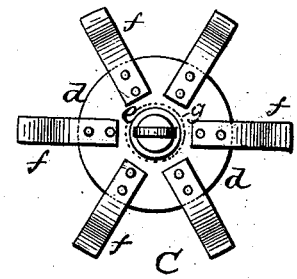
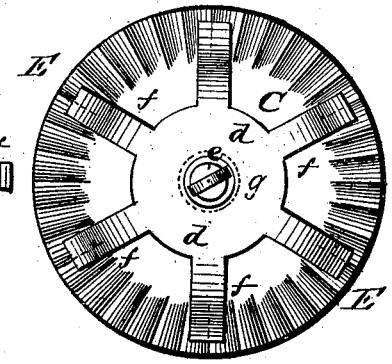

UNITED STATES PATENT OFFICE.

CHRIST LOSCHER, OF CHICAGO, ILLINOIS.

IMPROVEMENT IN SEWER-CLEANERS.

Specification forming part of Letters Patent No. 193,096, dated July 17, 1877; application filed June 29, 1877.

*To all whom it may concern:*

Be it known that I, CHRIST LOSCHER, of Chicago, in the county of Cook and State of Illinois, have invented certain new and useful Improvements in Devices for Cleaning Sewers; and I do hereby declare that the following is a full, clear, and exact description thereof, which will enable others skilled in the art to which it appertains to make and use the same, reference being had to the accompanying drawings and to the letters of reference marked thereon, which form a part of this specification.

This invention relates to a device for cleaning sewers, having for its object to furnish a practical durable and inexpensive machine, and one that is simple in its construction, not liable to get out of repair, and one that requires no skilled labor in use; and it consists in the construction and combination of parts, as will be hereinafter more fully described.

In the annexed drawing, Figure 1 represents a side elevation of the improvement, showing its position in the sewer, and Figs. 2, 3, and 4 are face views of different sections of the invention.

In the drawing, Fig. 1, A represents the sewer, and B the man-hole. C C C represent my invention, shown in three separate sections, connected together by pivots or hinges so as to render the device flexible between each two sections. When used in two or more sections the forward section is the smallest, and the others gradually increasing in size, as shown in Fig. 1.

In use, if the sewer is full or "stopped up," the smaller one is first passed through, and then the larger sections attached, the largest being nearly the size of the sewer, so that the entire sewer is cleaned.

The mode of operation of this invention is by drawing the device through the sewer, as represented in Fig. 1, a rope or chain, *a*, being attached to the forward end and passing under a roller, *b*, and over a roller, *c*, upon a frame, D, placed in the man-hole B.

The passing of the cord along from one man-hole to the other is effected by means of a wire running from one man-hole to the other. The cord is drawn through by the wire, while the wire last used is attached to the rear part of the machine, and drawn through from one man-hole to the other, and left there until again required to be used.

The sections above referred to are composed of a series of disks, *d*, having an opening in the central portion thereof to admit the shaft *e*, while the outer end of the disks terminate with rearwardly-curved spring-arms, *f*.

The disks are separated and held in position upon the shaft by means of the sleeves or collars *g*, while the shafts themselves are pivoted together so as to be attached and detached at pleasure.

At the rear of the machine is used one or more large disks, E, constructed as shown in Fig. 4, the arms of which are close together, so as to catch and drag along any heavy substance that may be in the sewer.

Having thus fully described my invention, what I claim as new, and desire to secure by Letters Patent, is—

1. The disks *d*, provided with the rearwardly-curved spring-arms *f*, in combination with the central shaft, substantially as and for the purpose set forth.

2. The sections C C C, flexibly connected together and gradually increasing in size, substantially as and for the purpose herein set forth.

3. The combination of the sections C C C, flexibly connected together, and the large disks E, substantially as and for the purpose set forth.

4. The combination of the disks *d*, curved spring-arms *f*, with the sleeves or collars, and the central shaft, substantially as and for the purpose set forth.

In testimony that I claim the foregoing as my own, I have hereunto affixed my signature in presence of two witnesses.

CHRIST LOSCHER.

Witnesses:
WM. B. UPPERMAN,
P. C. DIETERICH.